(12) United States Patent
Crim

(10) Patent No.: US 8,429,556 B2
(45) Date of Patent: Apr. 23, 2013

(54) CHUNKING DATA RECORDS

(75) Inventor: Christopher Crim, San Jose, CA (US)

(73) Assignee: Apple Inc., Cupertino, CA (US)

( * ) Notice: Subject to any disclaimer, the term of this patent is extended or adjusted under 35 U.S.C. 154(b) by 335 days.

(21) Appl. No.: 12/840,208

(22) Filed: Jul. 20, 2010

(65) Prior Publication Data

US 2012/0023439 A1  Jan. 26, 2012

(51) Int. Cl.
*G06F 3/048* (2006.01)

(52) U.S. Cl.
USPC .......................................................... 715/784

(58) Field of Classification Search .................. 715/784, 715/806
See application file for complete search history.

(56) References Cited

U.S. PATENT DOCUMENTS

| | | | | |
|---|---|---|---|---|
| 5,257,365 A * | 10/1993 | Powers et al. | | 1/1 |
| 5,442,784 A * | 8/1995 | Powers et al. | | 1/1 |
| 5,481,704 A * | 1/1996 | Pellicano | | 1/1 |
| 5,822,790 A * | 10/1998 | Mehrotra | | 711/213 |
| 6,651,052 B1 * | 11/2003 | Westphal | | 1/1 |
| 6,829,484 B1 * | 12/2004 | Kimoto et al. | | 455/456.1 |
| 6,885,377 B2 | 4/2005 | Lim et al. | | |
| 6,978,147 B2 * | 12/2005 | Coombes | | 455/466 |
| 6,988,098 B2 * | 1/2006 | Sonkin et al. | | 1/1 |
| 7,050,073 B2 | 5/2006 | Abler | | |
| 7,164,448 B2 | 1/2007 | Slipko et al. | | |
| 7,289,102 B2 * | 10/2007 | Hinckley et al. | | 345/156 |
| 7,860,844 B2 * | 12/2010 | Ebaugh et al. | | 707/696 |
| 8,078,992 B2 * | 12/2011 | Hart et al. | | 715/810 |
| 8,140,995 B1 * | 3/2012 | Zuverink et al. | | 715/784 |
| 2002/0021278 A1 * | 2/2002 | Hinckley et al. | | 345/156 |
| 2004/0012566 A1 * | 1/2004 | Bradski | | 345/158 |
| 2006/0225037 A1 * | 10/2006 | Glein et al. | | 717/117 |
| 2007/0211066 A1 | 9/2007 | Kanda | | |
| 2007/0296740 A1 | 12/2007 | Yu et al. | | |
| 2009/0089259 A1 * | 4/2009 | Musumeci et al. | | 707/3 |
| 2009/0100373 A1 * | 4/2009 | Pixley et al. | | 715/786 |
| 2009/0164602 A1 * | 6/2009 | Kies et al. | | 709/217 |
| 2010/0070924 A1 * | 3/2010 | Hart et al. | | 715/829 |
| 2010/0162126 A1 * | 6/2010 | Donaldson et al. | | 715/738 |
| 2011/0071979 A1 * | 3/2011 | Tahiliani et al. | | 707/600 |

* cited by examiner

*Primary Examiner* — Tuyetlien Tran
*Assistant Examiner* — Jessica Chuang
(74) *Attorney, Agent, or Firm* — Fish & Richardson P.C.

(57) ABSTRACT

Methods, program products, and systems of chunking data records are described. In general, in one aspect, a mobile device can provide for display on a display screen a scrollable window. The scrollable window can display first display content (e.g., a first segment of formatted data) stored in a first display buffer. The mobile device can determine that the scrollable window will cross a boundary of the first display buffer. Upon the determining, the mobile device can create second display content (e.g., a second segment of formatted data) in a second display buffer. The second display content can include display content that borders the first display content at the boundary. The mobile device can provide for display the second display content when the scrollable window crosses the boundary.

20 Claims, 9 Drawing Sheets

CHUNKING DATA RECORDS

TECHNICAL FIELD

This disclosure relates generally to database application programs on a mobile device.

BACKGROUND

A mobile device, such as a smart phone, can execute various application programs that access one or more data stores. The application programs can include, for example, a database reporting program that is configured to display a formatted view of data stored in the one or more data stores, or a database editing program that is configured to update the data in the one or more data stores. The data stores can be hosted on server computers that are located remotely from the mobile device. For the application programs to access the data stores, the mobile device can utilize one or more connections to the data stores through a communications network.

The application program can generate a data report to be displayed on a display screen of the mobile device. The display screen may not be sufficiently large to display the data report in the entirety. For example, the data report can include hundreds or thousands of rows or columns of data. At any given time, the display screen can only legibly display a portion of the rows of data of the data report. A user interface (e.g., a "previous page" control and a "next page" control) can be utilized to allow a user to browse through the data report.

SUMMARY

Methods, program products, and systems of chunking data records are described. In general, in one aspect, a mobile device can provide for display on a display screen a scrollable window. The scrollable window can display first display content (e.g., a first segment of formatted data records) stored in a first display buffer. The mobile device can determine that the scrollable window will cross a boundary of the first display buffer. Upon the determining, the mobile device can create second display content (e.g., a second segment of formatted data records) in a second display buffer. The second display content can include display content that borders the first display content at the boundary. The mobile device can provide for display the second display content when the scrollable window crosses the boundary.

Techniques of chunking data records can be utilized to realize one or more of the following advantages. Chunking data records allows a user to seamless scroll through large data report on a mobile device, even when the data report is not stored in memory in the entirety. When a user scrolls through the large data report, the user can have an experience of scrolling through the entire data report, rather than viewing the data report page by page. Transitions between display buffers can occur automatically and smoothly. The entire data report need not be formatted at once and stored in memory, thus saving computing resources of the mobile device.

The mobile device can retrieve data from a remote data store in segments rather than retrieving data all at once or retrieving a new data record whenever a new row of data enters on a display window. Thus, bandwidth of data communications between the mobile device and the data store can be utilized efficiently.

Creating display content of a second display buffer before a scroll window actually reaches the display content of the second display buffer can provide smooth transitions from one display buffer to another. Due to the efficient use of data communication bandwidth and the smooth transition, a user can have a better experience browsing a large data report generated from data in a remote data store using the data record chunking technologies than using conventional technologies.

The details of one or more implementations of techniques of chunking data records are set forth in the accompanying drawings and the description below. Other features, aspects, and advantages of chunking data records will become apparent from the description, the drawings, and the claims.

BRIEF DESCRIPTION OF THE DRAWINGS

Like reference symbols in the various drawings indicate like elements.

DETAILED DESCRIPTION

Overview of Chunking Data Records

Figure 1:
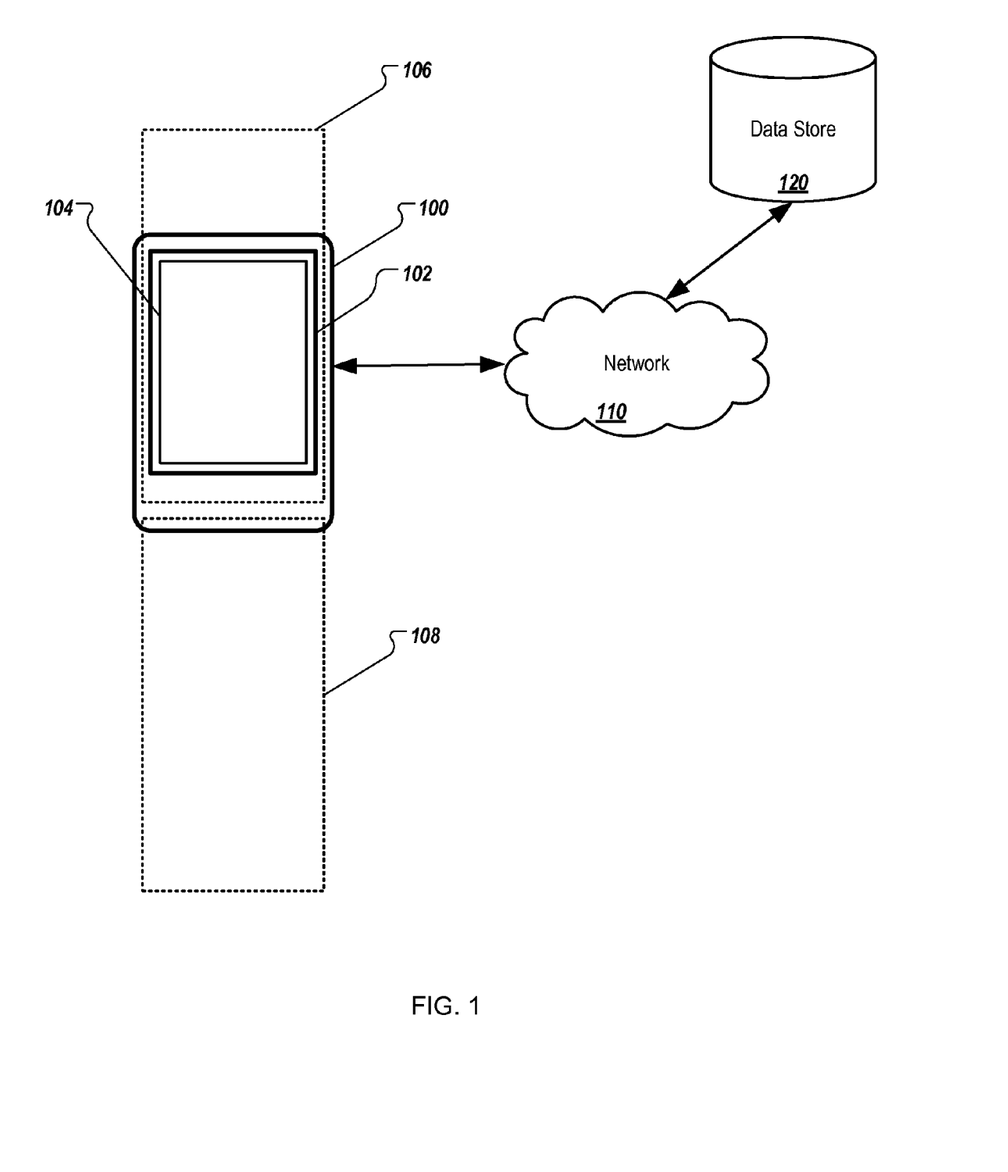
FIG. 1 illustrates exemplary techniques of chunking data records.

FIG. 1 illustrates exemplary techniques of chunking data records. Chunking data records can include displaying a large body of content in segments (or chunks) using multiple display buffers. For convenience, the techniques will be described in reference to mobile device 100, which can be an exemplary mobile device configured to implement the features and operations of chunking data records.

The display content can include a portion of a data report. The data report can include formatted data records produced by an exemplary application program executing on mobile device 100. A data record can be a unit of data. A formatted data record can be a data record that is given specific display characteristics, e.g., width, height, font size, space above, and space below. The exemplary application program can be a database reporting program or a database editing program. The application program can retrieve data from data store 120. Data store 120 can be a local data store hosted on mobile device 100, or a data store hosted remotely from mobile device 100. In this example, data store 120 can be a remote data store connected to mobile device 100 through a wired or wireless communications network 110. The application program can create the data report by formatting the retrieved data.

The data report created by the application program, in the entirety, may not fit on a single display screen. The data report can include data retrieved using various selection criteria. Multiple data records in data store 120 can satisfy the selection criteria. A data set that includes all data records that satisfy the selection criteria can be large when formatted, compared to what can be displayed on a single display screen 102 at one time. For example, the application program can create a employee/sales revenue report that can include hundreds or thousands of rows. Due to limitation by a physical size of display screen 102, not all formatted data records can be displayed at once. Accordingly, mobile device 100 can determine to retrieve and format the data records a segment at a time.

Mobile device 100 can segment the data report of the application program into multiple segments or chunks. Each segment of the data report can include a portion of a formatted data record (e.g., a portion of a large text body), a formatted data record in the entirety, or multiple formatted data records. Each segment of the data report can be stored in a display buffer as display content. The display buffer can include a section of memory or other storage device. The display buffer (e.g., display buffer 106) can have a size (e.g., 10,000 pixels in height) that is larger at least in one dimension than a size of display screen 102 (e.g., 640 pixels in height for a smart phone, or 1024 pixels in height for a tablet device).

Mobile device 100 can provide scrollable window 104 that corresponds in size with display screen 102. Scrollable window 104 can be a portion of display buffer 106 that is currently being displayed on display screen 102. Scrollable window 104 can respond to a user input (e.g., a gesture on a touch-sensitive display device) and scroll up or down, left or right, or in another direction, according to a direction of the input. When scrollable window 104 scrolls within the boundaries of display buffer 106, e.g., between an upper boundary and a lower boundary, if the scrolling is vertical, mobile device 100 can provide display content in display buffer 106 for display without having to retrieve more data records from data store 120 or from a local cache or formatting the data records.

When mobile device 100 determines that scrollable window 104 will cross a boundary of display buffer 106, mobile device 100 can create display content for display buffer 108 in anticipation of the crossing. For example, when scrollable window 104 reaches a boundary of display buffer 106, or is proximate to and scrolls towards the boundary of display buffer 106, mobile device 100 can create display content of display buffer 108, including retrieving more data records and formatting the retrieved data records. The display content in display buffer 106 and the display content in display buffer 108 can be neighboring portions of a same data report. The display content in display buffer 106 and 108 can border one another at the boundary.

In some implementations, mobile device 100 can retrieve all data records that satisfy the selection criteria, and store the retrieved data records in a cache. Mobile device 100 can retrieve data stored in the cache and format the retrieved data to create display content of display buffers 106 and 108 without further accessing data store 120. The cached data can be formatted in segments. The segments can be stored in display buffers 106 and 108 as scrollable window 104 scrolls across boundaries of display buffers.

Figure 2:
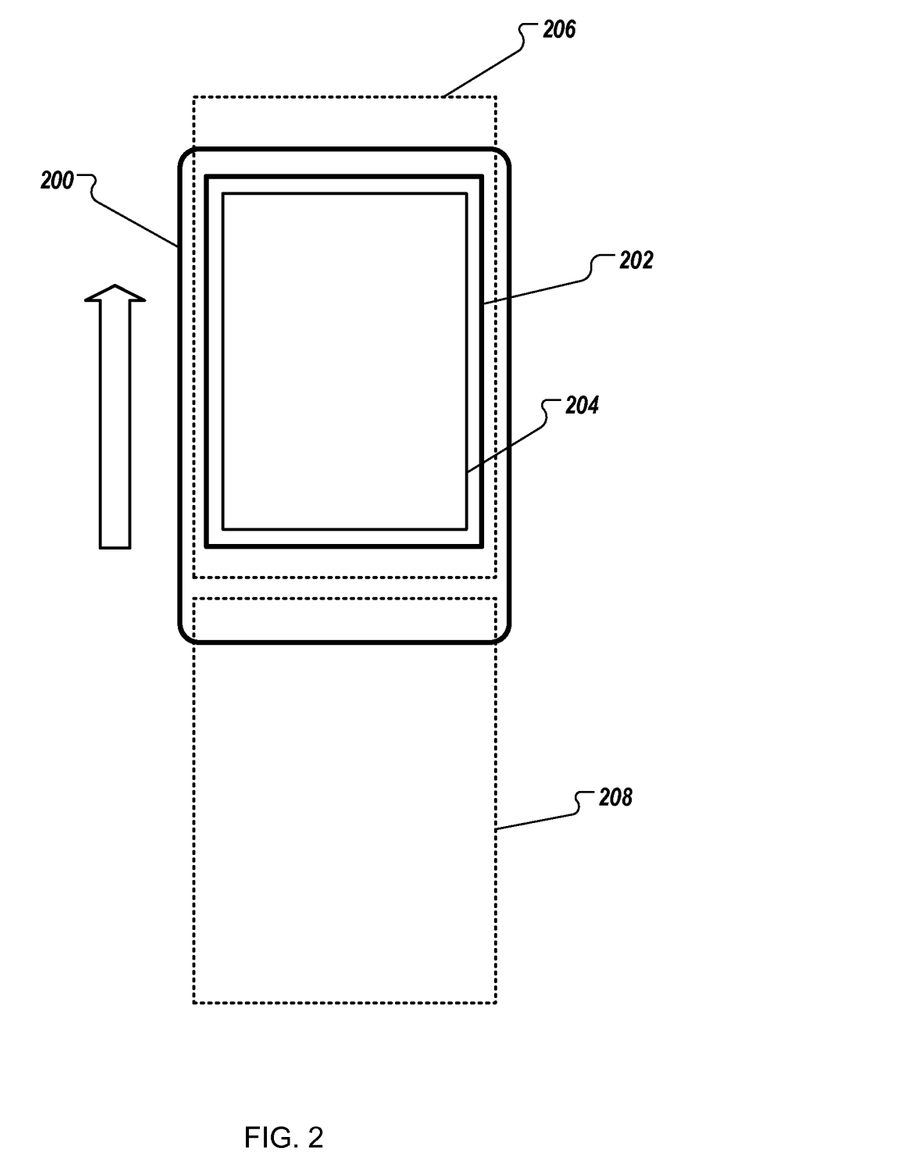
FIG. 2 illustrates exemplary techniques of creating display content for a new display buffer upon determining that a scrollable window will cross a boundary of a current display buffer.

FIG. 2 illustrates exemplary techniques of creating display content for a new display buffer upon determining that a scrollable window will cross a boundary of a current display buffer.

Mobile device 200 can provide for display on display screen 202 scrollable window 204. Scrollable window 204 can display a portion of display content stored in display buffer 206, which can store display content. The display content can include a portion of a formatted data record (e.g., a portion of a large text body), a formatted data record in the entirety, or multiple formatted data records. Display screen 202 can be a touch-sensitive display device that is configured to receive a touch input (e.g., a gesture) by a touch means (e.g., a finger or a stylus) on display screen 202. In response to the touch input, scrollable window 204 can scroll and display different portions of display buffer 206.

For example, in response to a scroll-up gesture, scrollable window 204 can move towards a lower boundary of display buffer 206. When scrollable window 204 reaches the lower boundary of display buffer 206, mobile device 200 can automatically create display content for display buffer 208 and store the created display content in display buffer 208. Further movement of scrollable window 204 can cause display content of display buffer 208 to be displayed on display screen 202. Creating display content in display buffer 208 can include retrieving and formatting one or more data records from a data store or a cache.

In some implementations, before scrollable window 204 reaches the lower boundary of display buffer, mobile device 200 can identify data records that, when formatted, can be stored in display buffer 208 that borders display buffer 206 at the lower boundary of display buffer 206. Identifying the data records can include identifying a data record that is located next to a last data record of display buffer 206, or a data record that is partially located in display buffer 206. Mobile device 200 can format the identified data records to be stored in display buffer 208. In some implementations, formatting the identified data records can occur before scrollable window 204 reaches the lower boundary of display buffer 206. When scrollable window 204 crosses the lower boundary of display buffer, scrollable window 204 can display a portion display content of display buffer 208. Transition from displaying display content of display buffer 206 to displaying display content of display buffer 208 can be a smooth transition when resource-intensive formatting of the data has already occurred.

Figure 3A:
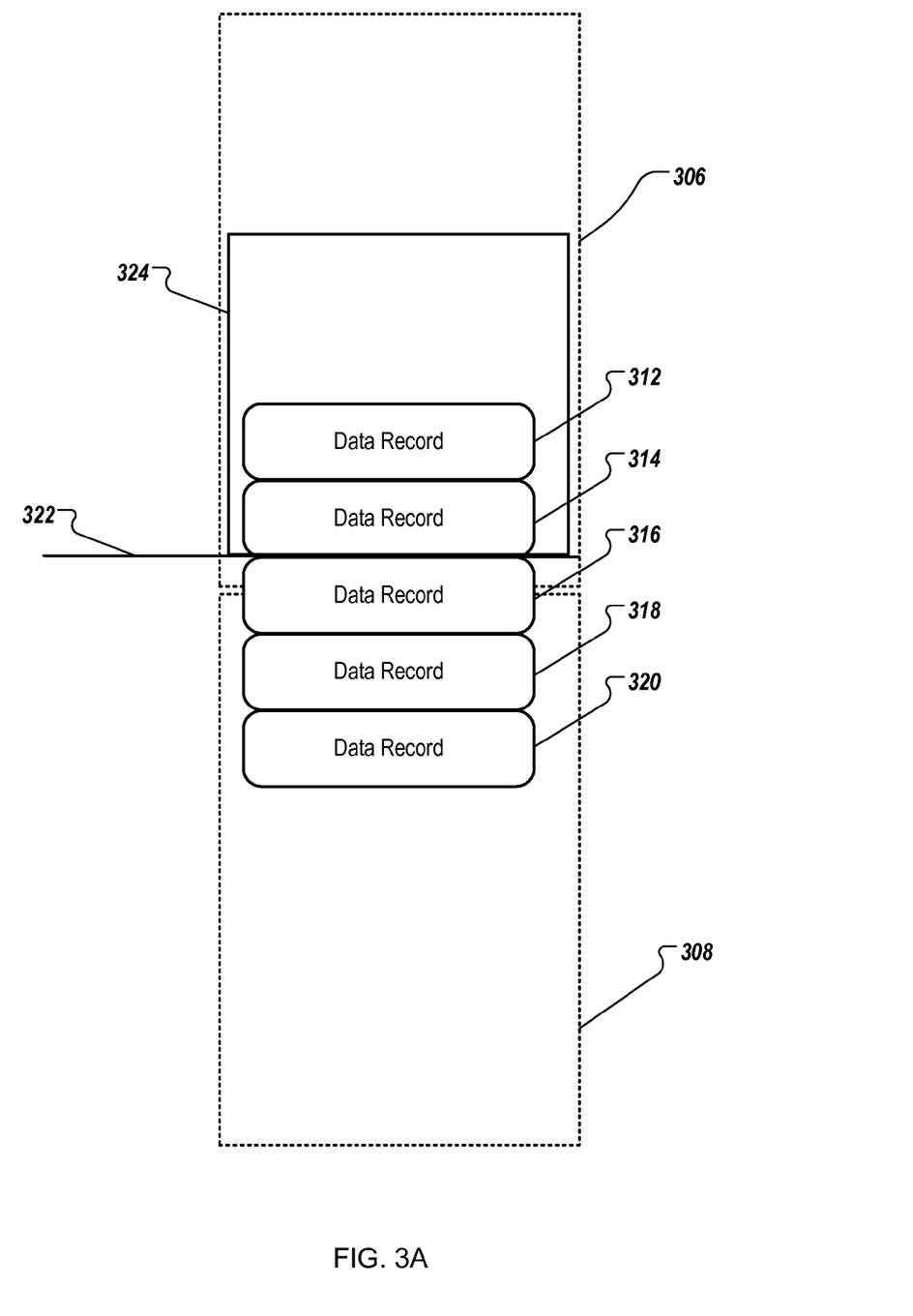
FIGS. 3A and 3B illustrate exemplary techniques of predicting that a scrollable window will reach a boundary of a display buffer based on characteristics of display content in the display buffer.

FIG. 3A illustrates exemplary techniques of identifying a data record to be formatted when creating display content for a new display buffer. An application program executing on the mobile device can produce a data report that includes multiple data records 312, 314, 316, 318, and 320. Data record 316 can intersect a boundary of display buffer 306. Some portions of data record 316, when formatted, can be included in display buffer 306. When the mobile device formats the data records, the mobile device can identify data record 316 that intersects the boundary, and mark data record 316 and store data record on a storage device.

Scrollable window 324 can be utilized to display a portion of display content of display buffer 306. When the mobile device detects that scrollable window 324 will cross a boundary (e.g., a lower boundary) of display buffer 306, the mobile device can create neighboring display content and store the display content in display buffer 308. Creating the neighboring display content can include retrieving one or more data records from a data store or a cache and formatting the retrieved data records. The mobile device can identify that data record 316 has already been retrieved at the time display content of display buffer 306 was created, based on a mark of data record 316. The mobile device can retrieve data record 316 from a storage device. The mobile device can retrieve a next data record (e.g., data record 318) from the data store.

In some implementations, the mobile device can predict that a scrollable window will reach a boundary of a display buffer based on characteristics of display content in the display buffer. The mobile device can identify marker 322 as an indicator indicating that display content for new display buffer 308 will be created. Marker 322 can be a top portion of data record 316 that, when crossed by at least a portion of scrollable window 324, can cause at least a portion of data record 316 to be displayed on a display screen. If scrollable window 324 scrolls down and reaches marker 322, the mobile device can proceed to format portions of data record 316 and data records 318 and 320 for display buffer 308. In some implementations, the mobile device can retrieve data records 318 and 320 from a data store, if data records 318 and 320 have not been stored in a cache memory on the mobile device.

Figure 3B:
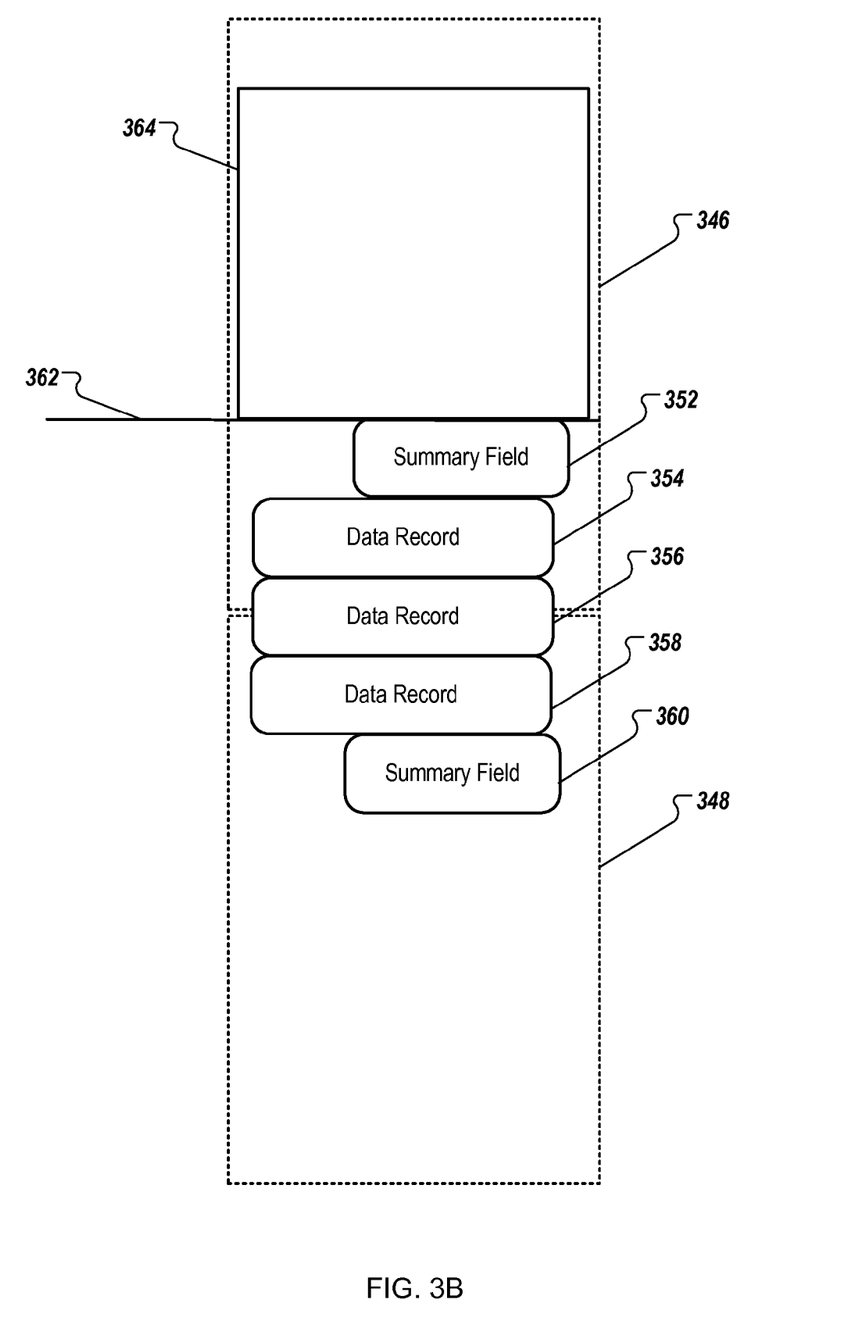

FIG. 3B illustrates exemplary techniques of identifying a set of data record to be formatted when creating display content for a new display buffer. Data records 354, 356, and 358 can be grouped according to one or more specified criteria. For example, data records relating to employees and sales revenues can be grouped by regional offices of a company. Data records 354, 356, and 358 can relate to employees in a specific regional office. The grouped data record can be associated with one or more derived data fields (e.g., summary field 352 and summary field 360). A derived data field can be a data field that is calculated based on the data fields in the group. For example, summary field 352 can include a total number of employees in the regional office. Summary field 360 can include a total amount of sales revenue from the regional office. In some implementations, a derived data field can be a data record stored in a data store. In some implementations, a derived data field can be calculated during formatting, "on the fly."

Data records 354, 356, and 358, when formatted, can intersect a boundary of display buffer 346 as a group. When the mobile device determines that scrollable window 364 will cross the boundary of display buffer 346, the mobile device can create neighboring display content and store the display content in display buffer 348. Creating the neighboring display content can include retrieving one or more data records from a data store or a cache and formatting the retrieved data records. The mobile device can determine that summary field 360 is to be calculated based on data records 354, 356, and 358. The mobile device can determine that data records 354 and 356 have already been retrieved at the time display content of display buffer 346 was created. The mobile device can retrieve other data records in the group (e.g., data record 358) from a data store and calculate the value of summary field 360.

In some implementations, the mobile device can store all data records 354, 356, and 358 as a group in a cache when creating display content in display buffer 346. Display content in display buffer 346 can include formatted summary field 352. When creating display content in display buffer 346, the mobile device can calculate value of summary field 352. To calculate the value of summary field 352, the mobile device can retrieve all data records in the group to which summary field 352 is associated, including data records 354, 356, and 358. The mobile device can cache data records 354, 356, and 358 to be used when creating display content of display buffer 348.

The mobile device can predict that scrollable window 364 will reach a boundary of display buffer 346 based on a group of data records intersecting the boundary. When the mobile device formats the data records, the mobile device can identify that a group of data records 354, 356, and 358, as a whole, intersects the boundary. The mobile device can use marker 362 as an indicator indicating display content for new display buffer 348 will be created. Marker 362 can be a top portion of a top data record or derived data field in the group (or bottom portion of a bottom data record or derived data field in the group). When at least a portion of scrollable window 364 crosses marker 362, can cause at least a portion of the group of data records 354, 356, and 358 to be displayed. If scrollable window 364 scrolls down and reaches marker 362, the mobile device can proceed to create display content for display buffer 348.

Figure 4A:
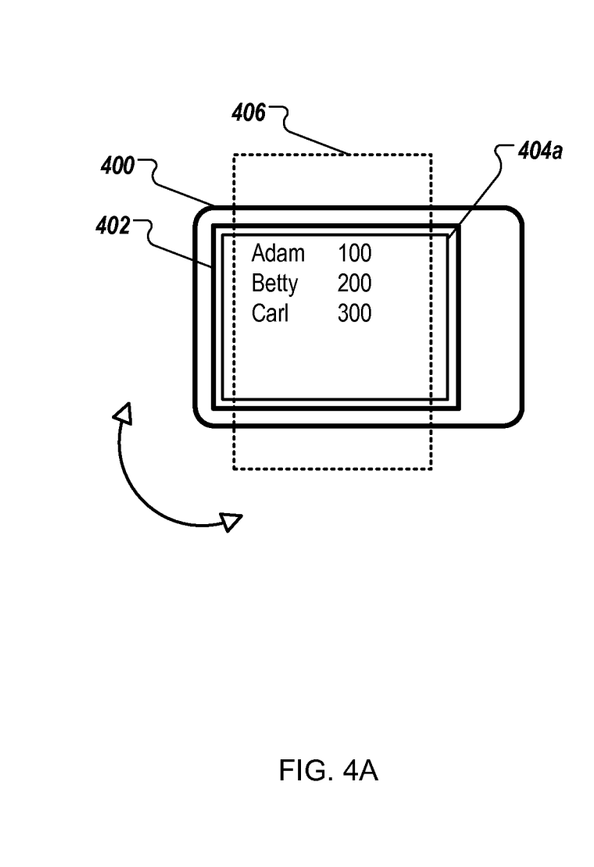
FIGS. 4A and 4B illustrate exemplary techniques of predicting that a scrollable window will reach a boundary of a display buffer when a mobile device changes orientation.
Figure 4B:
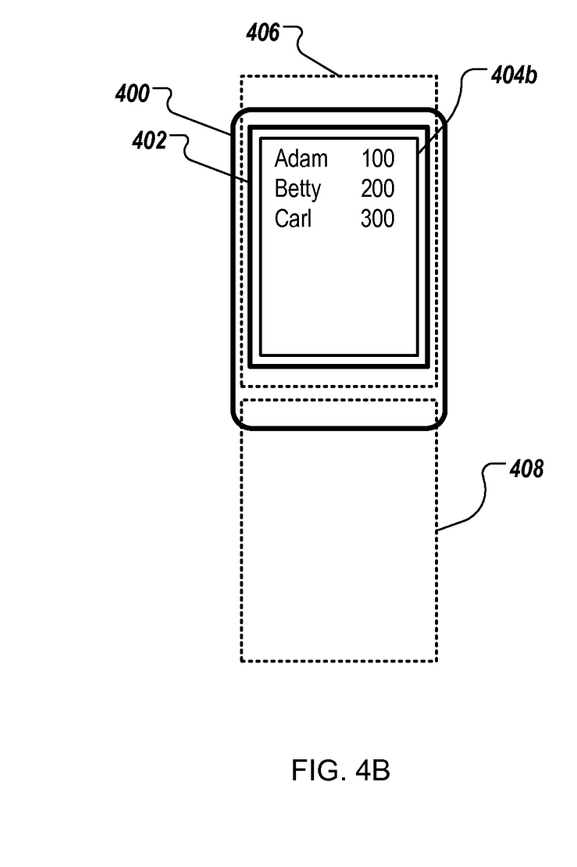

FIGS. 4A and 4B illustrate exemplary techniques of predicting that a scrollable window will reach a boundary of a display buffer when a mobile device changes orientation. Mobile device 400 can include a sensor that is configured to detect an orientation of mobile device 400. Mobile device 400 can display content in a landscape mode when the sensor indicates that mobile device 400 has a substantially horizontal orientation, and in a portrait mode when determines that mobile device 400 has a substantially vertical orientation.

FIG. 4A illustrates scrollable window 404a displayed in a landscape mode. A portion of display content in display buffer 406 can be displayed in scrollable window 404a. Mobile device 400 can determine a dimension of scrolling window 404a according to a dimension of display screen 402 on which scrollable window 404a is displayed. For example, in some implementations, the dimension of scrollable window 404a can have the same dimension, including same height width, of display screen 402.

In FIG. 4A, mobile device 400 and display screen 402 can have a horizontal orientation. Scrollable window 404a can display content in a landscape mode. In the landscape mode, a width of scrollable window 404a can be greater than a height of scrollable window 404a. The portion of content of display buffer 406 that is displayed in scrollable window 404a has not reached a lower boundary of display buffer 406.

FIG. 4B illustrates scrollable window 404b displayed in a portrait mode. An orientation of mobile device 400 can change from horizontal to vertical. Upon the change of orientation, scrollable window 404b can display content in a portrait mode. In the portrait mode, a height of scrollable window 404b can be greater than a width of scrollable window 404b.

In some implementations, a top portion of a scrollable window can remain constant (e.g., focused on a same data record) when the scrollable window changes between a portrait mode and a landscape mode. For example, a top portion of scrollable window 404a can display formatted data records that relates sales revenue to employee names. The formatted data records "Adam 100," "Betty 200," and "Carl 300" in landscape mode. Scrollable window 404b can continue displaying the formatted data records "Adam 100," "Betty 200," and "Carl 300" in a top portion using the same font size as in scrollable window 404a. Scrollable window 404b can be taller than scrollable window 404a. As a result, mobile device 400 can determine that scrollable window 404b can cross a lower boundary of display buffer 406 in response to a change of orientation of mobile device 400 from horizontal to vertical. Mobile device 400 can respond to the change of orientation by automatically creating display content for display buffer 408, including, for example, retrieving and formatting data records not currently stored in display buffer 406.

Figure 5A:
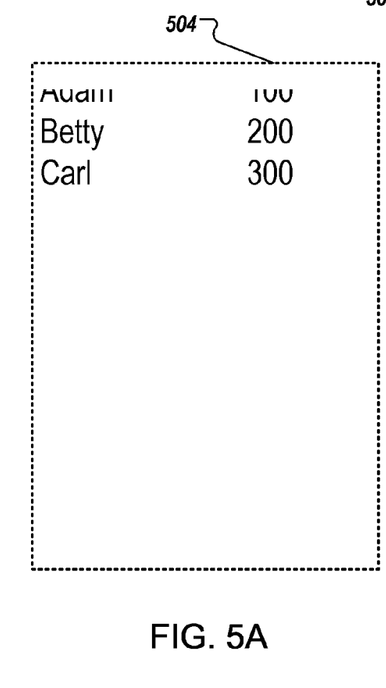
FIGS. 5A, 5B, and 5C illustrate exemplary display buffers and exemplary display of content in the display buffers.
Figure 5B:
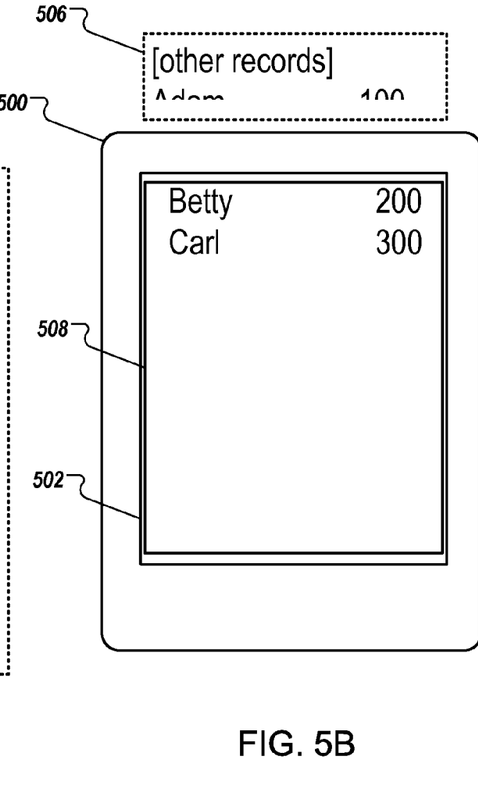
Figure 5C:
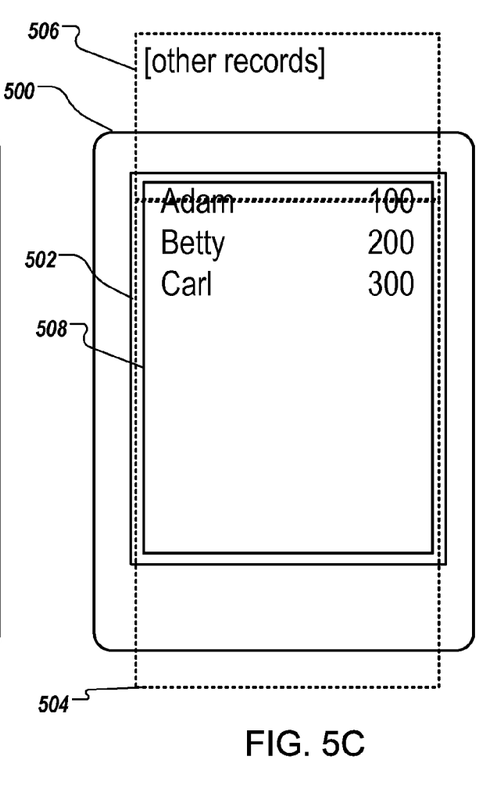

FIGS. 5A, 5B, and 5C illustrate exemplary display buffers and exemplary display of content in the display buffer. FIG. 5A illustrates exemplary display buffer 504 containing display content. The display content can include one or more complete or partial data records that have been formatted. For example, formatted data records "Betty 200" and "Carl 300"

are positioned completely within display buffer 504. Another formatted data record, "Adam 100," intersects a boundary of display buffer 504. As such, only a portion of formatted data record "Adam 100" (e.g., a lower portion) is included in display buffer 504. The boundary of display buffer 504 can be determined based on a total size of a data report and a size of display buffer 504. In some implementation, the boundary can correspond to a pixel position that is calculated by dividing the total size of the data report and the size of display buffer 504. For example, if the total size of a data report is 35,000 pixels high, and a size of display buffer 504 is 10,000 pixels high, a vertical position of the boundary can be at pixel 10,000, 20,000, and 30,000. A horizontal position of the boundary can be calculated likewise.

FIG. 5B illustrates exemplary mobile device 500 displaying a portion of display content of display buffer 504 on display screen 502. Display screen 502 can correspond to scrollable window 508 that has the same dimension as display screen 502. For convenience, and to distinguish a scrollable window and an actual display screen, scrollable window 508 is shown in FIG. 5B to be inside display screen 502. Scrollable window 508 can be utilized to display a portion of display content of display buffer 504. The scrollable window can scroll up upon an input (e.g., a touch screen input). As the scrollable window scrolls, display content (e.g., formatted data records "Carl 300" and "Betty 200") can come into view on display screen 502, in that order.

As the scrollable window continues to scroll, the scrollable window can reach formatted data record "Adam 100," which intersects the upper boundary of display buffer 504. Upon detecting that the scrollable window reaches the formatted data record "Adam 100," mobile device 500 can create display content for display buffer 506. Creating the display content for display buffer 506 can include formatting a portion of the record "Adam 100" that is not in display buffer 504. Creating the display content for display buffer 506 can include creating other display content, e.g., other formatted data records.

FIG. 5C illustrates exemplary mobile device 500 displaying both display content of display buffer 504 and display content of display buffer 506 on display screen 502. As scrollable window 508 continues to scroll up, the portion of the formatted data record "Adam 100" that is in display buffer 504, and then the portion of the formatted data record "Adam 100" that is in display buffer 506, are displayed on display device 502. If scrollable window 508 scrolls up further, other display content in display buffer 506 (e.g., other formatted data records) can be displayed. Transition between display buffer 504 and display buffer 506 can be automatic. For example, the transition can occur without requiring a user to select a "previous page" or a "next page" using a user interface.

Exemplary Processes of Chunking Data Records

Figure 6:
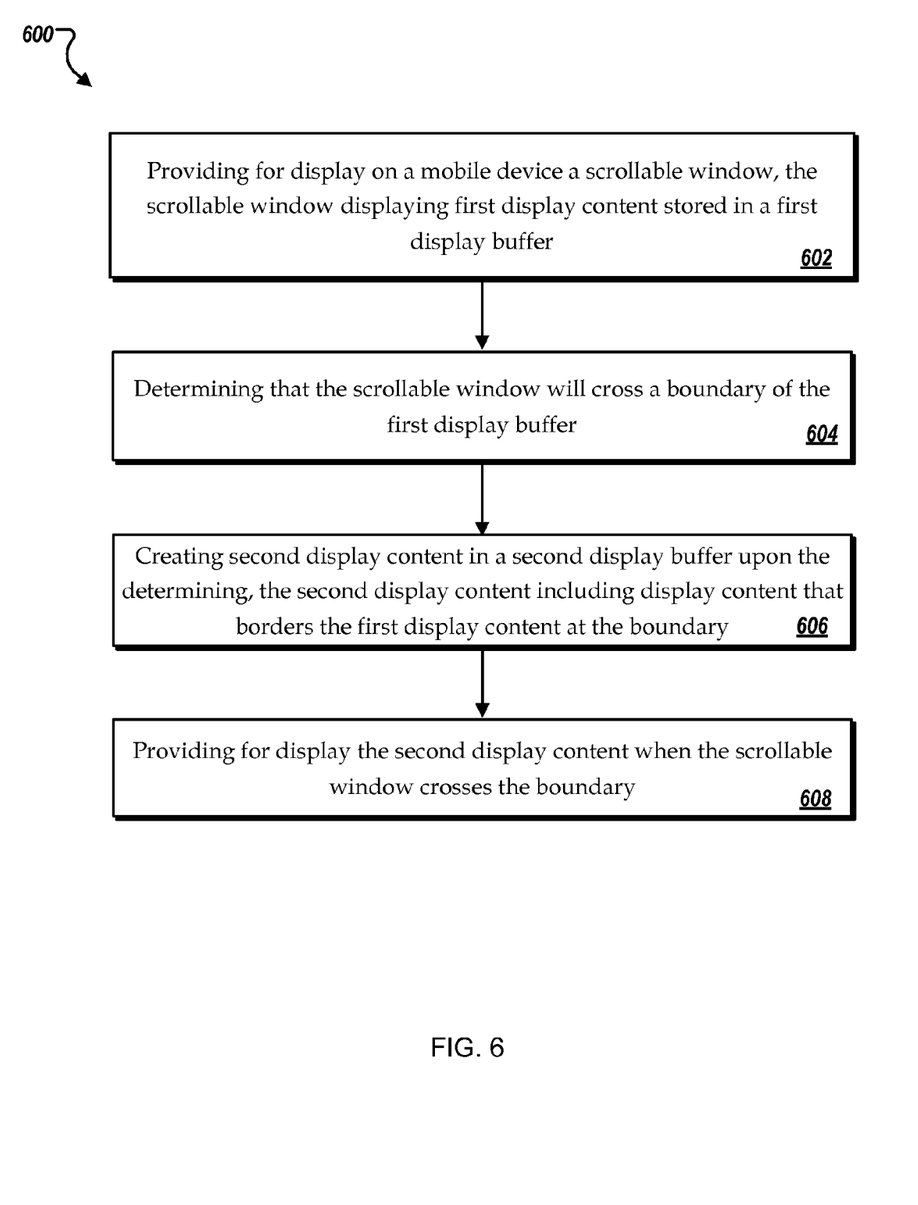
FIG. 6 is a flowchart illustrating an exemplary process of chunking data records.

FIG. 6 is a flowchart illustrating exemplary process 600 of chunking data records. For convenience, exemplary process 600 will be described in reference to a mobile device that implements exemplary process 600.

The mobile device can provide (602) for display on a display screen a scrollable window. The scrollable window can display first display content stored in a first display buffer. The first display content can include data records retrieved from a data store and formatted using a layout. The mobile device can be connected to the data store through a communications network.

The mobile device can determine (604) that the scrollable window will cross a boundary of the first display buffer. In some implementations, determining that the scrollable window will cross the boundary can include determining that the scrollable window has reached the boundary. In some implementations, determining that the scrollable window will cross the boundary can include determining that a change of orientation of the mobile device will cause the scrollable window to change display modes, for example, between a portrait mode and a landscape mode, and determining that the change of display mode will cause the scrollable window to reach the boundary. Determining that the scrollable window has reached the boundary can include determining that at least a pixel of the scrollable window is on the boundary of the display buffer. For example, determining that the scrollable window has reached the boundary can include that a row (or column) of pixels in the scrollable window is the last row (or column) of the first display buffer at a direction of scrolling.

In some implementations, determining that the scrollable window will cross the boundary can occur before the scrollable window actually reaches the boundary. Determining that the scrollable window will cross the boundary can include determining that the scrollable window has reached a data record that intersects the boundary. Determining that the scrollable window will cross the boundary can include determining that the scrollable window has reached a set of data records that, as a group, intersect the boundary. Thus, the mobile device can determine that the scrollable window will cross the boundary before the scrollable window reaches the boundary even when no particular data record intersects the boundary. The set of data records can include data records grouped according to one or more criteria. In some implementations, the set of data records can include a derived data field, the derived field being calculated based on data records in the group. For example, the derived data field can be a summary data field.

The mobile device can automatically create (606) second display content in a second display buffer upon determining that the scrollable window will cross a boundary of the first display buffer. The second display content can include display content that borders the first display content at the boundary. The second display content can include data records retrieved from a data store and formatted using a layout. Creating the second display content in the second display buffer can include identifying one or more data records to be retrieved and formatted. Creating the second display content in the second display buffer can include retrieving the identified one or more data records from the data store. Creating the second display content can additionally include storing the formatted set of data records in the second display buffer.

In stage 606, identifying one or more data records to be retrieved and formatted can include identifying a data record that, when formatted, intersects the boundary. Identifying one or more data records to be retrieved and formatted can include identifying a set of data records that, as a group, intersects the boundary. Identifying one or more data records to be retrieved and formatted can include identifying a derived data field, the derived data field having a value that is calculated based the set of data records. The derived data field can be a summary data field The mobile device can provide (608) for display the second display content when the scrollable window actually crosses the boundary. Providing for display the second display content can include providing for display a portion of the second display content and a portion the first display content on a same display screen.

Exemplary Mobile Device Architecture

Figure 7:
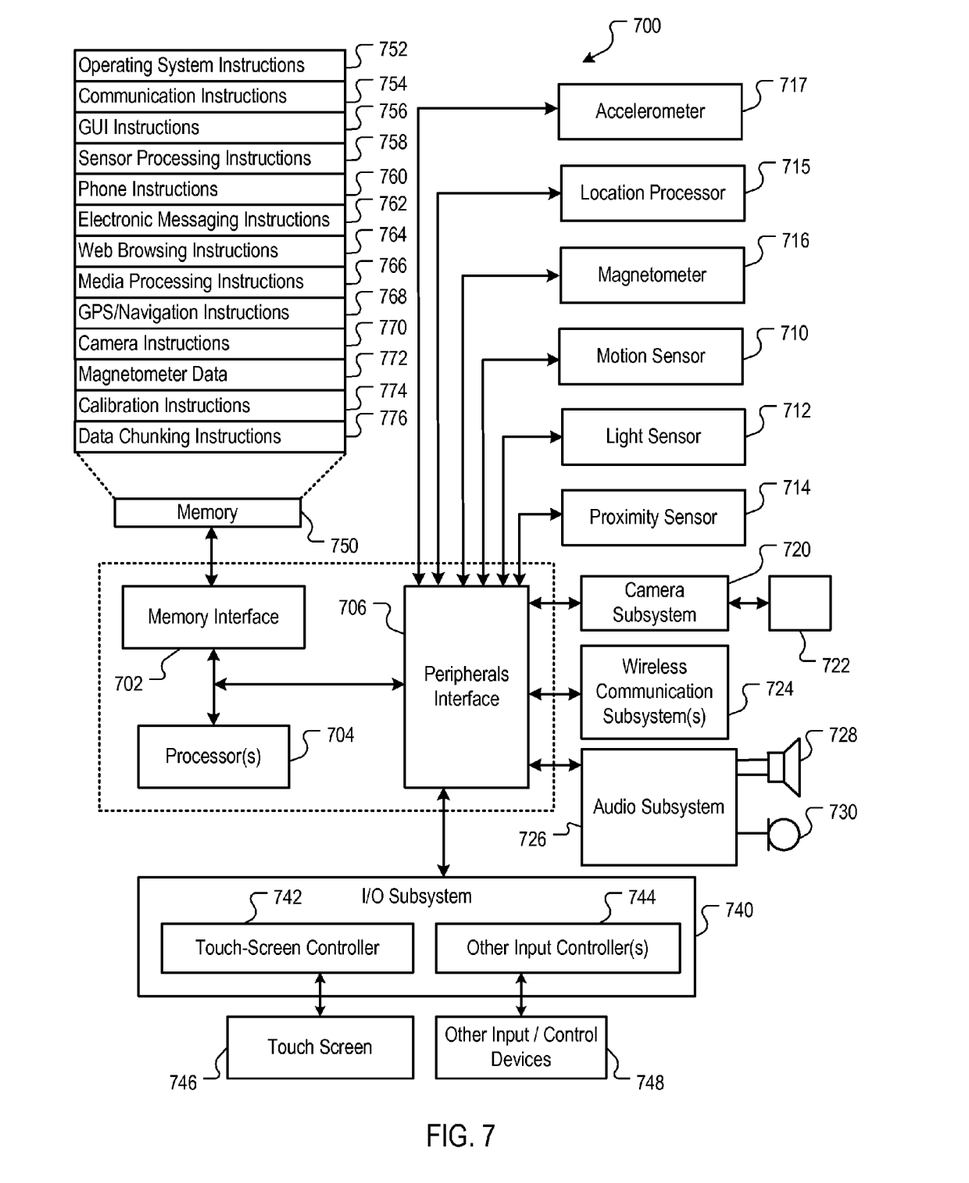
FIG. 7 is a block diagram illustrating an exemplary device architecture of a mobile device implementing the features and operations of chunking data records.

FIG. 7 is a block diagram of an exemplary architecture 700 for a mobile device implementing the features and operations of chunking data records. A mobile device (e.g., mobile device 100) can be, for example, a handheld computer, a personal digital assistant, a cellular telephone, an electronic tablet, a network appliance, a camera, a smart phone, an enhanced general packet radio service (EGPRS) mobile phone, a network base station, a media player, a navigation device, an email device, a game console, or a combination of any two or more of these data processing devices or other data processing devices.

Mobile device 100 can include memory interface 702, one or more data processors, image processors and/or processors 704, and peripherals interface 706. Memory interface 702, one or more processors 704 and/or peripherals interface 706 can be separate components or can be integrated in one or more integrated circuits. Processors 704 can include application processors (APs) and baseband processors (BPs). The various components in mobile device 100, for example, can be coupled by one or more communication buses or signal lines.

Sensors, devices, and subsystems can be coupled to peripherals interface 706 to facilitate multiple functionalities. For example, motion sensor 710, light sensor 712, and proximity sensor 714 can be coupled to peripherals interface 706 to facilitate orientation, lighting, and proximity functions of the mobile device. Location processor 715 (e.g., GPS receiver) can be connected to peripherals interface 706 to provide geopositioning. Electronic magnetometer 716 (e.g., an integrated circuit chip) can also be connected to peripherals interface 706 to provide data that can be used to determine the direction of magnetic North. Thus, electronic magnetometer 716 can be used as an electronic compass. Accelerometer 717 can also be connected to peripherals interface 706 to provide data that can be used to determine change of speed and direction of movement of the mobile device.

Camera subsystem 720 and an optical sensor 722, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 724, which can include radio frequency receivers and transmitters and/or optical (e.g., infrared) receivers and transmitters. The specific design and implementation of the communication subsystem 724 can depend on the communications network(s) over which a mobile device is intended to operate. For example, a mobile device can include communication subsystems 724 designed to operate over a GSM network, a GPRS network, an EDGE network, a Wi-Fi or WiMax network, and a Bluetooth network. In particular, the wireless communication subsystems 724 can include hosting protocols such that the mobile device can be configured as a base station for other wireless devices.

Audio subsystem 726 can be coupled to a speaker 728 and a microphone 730 to facilitate voice-enabled functions, such as voice recognition, voice replication, digital recording, and telephony functions.

I/O subsystem 740 can include touch screen controller 742 and/or other input controller(s) 744. Touch-screen controller 742 can be coupled to a touch screen 746 or pad. Touch screen 746 and touch screen controller 742 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with touch screen 746.

Other input controller(s) 744 can be coupled to other input/control devices 748, such as one or more buttons, rocker switches, thumb-wheel, infrared port, USB port, and/or a pointer device such as a stylus. The one or more buttons (not shown) can include an up/down button for volume control of speaker 728 and/or microphone 730.

In one implementation, a pressing of the button for a first duration may disengage a lock of the touch screen 746; and a pressing of the button for a second duration that is longer than the first duration may turn power to mobile device 100 on or off. The user may be able to customize a functionality of one or more of the buttons. The touch screen 746 can, for example, also be used to implement virtual or soft buttons and/or a keyboard.

In some implementations, mobile device 100 can present recorded audio and/or video files, such as MP3, AAC, and MPEG files. In some implementations, mobile device 100 can include the functionality of an MP3 player, such as an iPod™. Mobile device 100 may, therefore, include a pin connector that is compatible with the iPod. Other input/output and control devices can also be used.

Memory interface 702 can be coupled to memory 750. Memory 750 can include high-speed random access memory and/or non-volatile memory, such as one or more magnetic disk storage devices, one or more optical storage devices, and/or flash memory (e.g., NAND, NOR). Memory 750 can store operating system 752, such as Darwin, RTXC, LINUX, UNIX, OS X, WINDOWS, or an embedded operating system such as VxWorks. Operating system 752 may include instructions for handling basic system services and for performing hardware dependent tasks. In some implementations, operating system 752 can include a kernel (e.g., UNIX kernel).

Memory 750 may also store communication instructions 754 to facilitate communicating with one or more additional devices, one or more computers and/or one or more servers. Memory 750 may include graphical user interface instructions 756 to facilitate graphic user interface processing; sensor processing instructions 758 to facilitate sensor-related processing and functions; phone instructions 760 to facilitate phone-related processes and functions; electronic messaging instructions 762 to facilitate electronic-messaging related processes and functions; web browsing instructions 764 to facilitate web browsing-related processes and functions; media processing instructions 766 to facilitate media processing-related processes and functions; GPS/Navigation instructions 768 to facilitate GPS and navigation-related processes and instructions; camera instructions 770 to facilitate camera-related processes and functions; magnetometer data 772 and calibration instructions 774 to facilitate magnetometer calibration. The memory 750 may also store other software instructions (not shown), such as security instructions, web video instructions to facilitate web video-related processes and functions, and/or web shopping instructions to facilitate web shopping-related processes and functions. In some implementations, the media processing instructions 766 are divided into audio processing instructions and video processing instructions to facilitate audio processing-related processes and functions and video processing-related processes and functions, respectively. An activation record and International Mobile Equipment Identity (IMEI) or similar hardware identifier can also be stored in memory 750. Memory 750 can include data chunking instructions 776 that configured to cause, when activated, one or more processors 704 to perform operations of chunking data records as described above.

Each of the above identified instructions and applications can correspond to a set of instructions for performing one or more functions described above. These instructions need not be implemented as separate software programs, procedures, or modules. Memory 750 can include additional instructions or fewer instructions. Furthermore, various functions of the mobile device may be implemented in hardware and/or in software, including in one or more signal processing and/or application specific integrated circuits.

Exemplary Operating Environment

Figure 8:
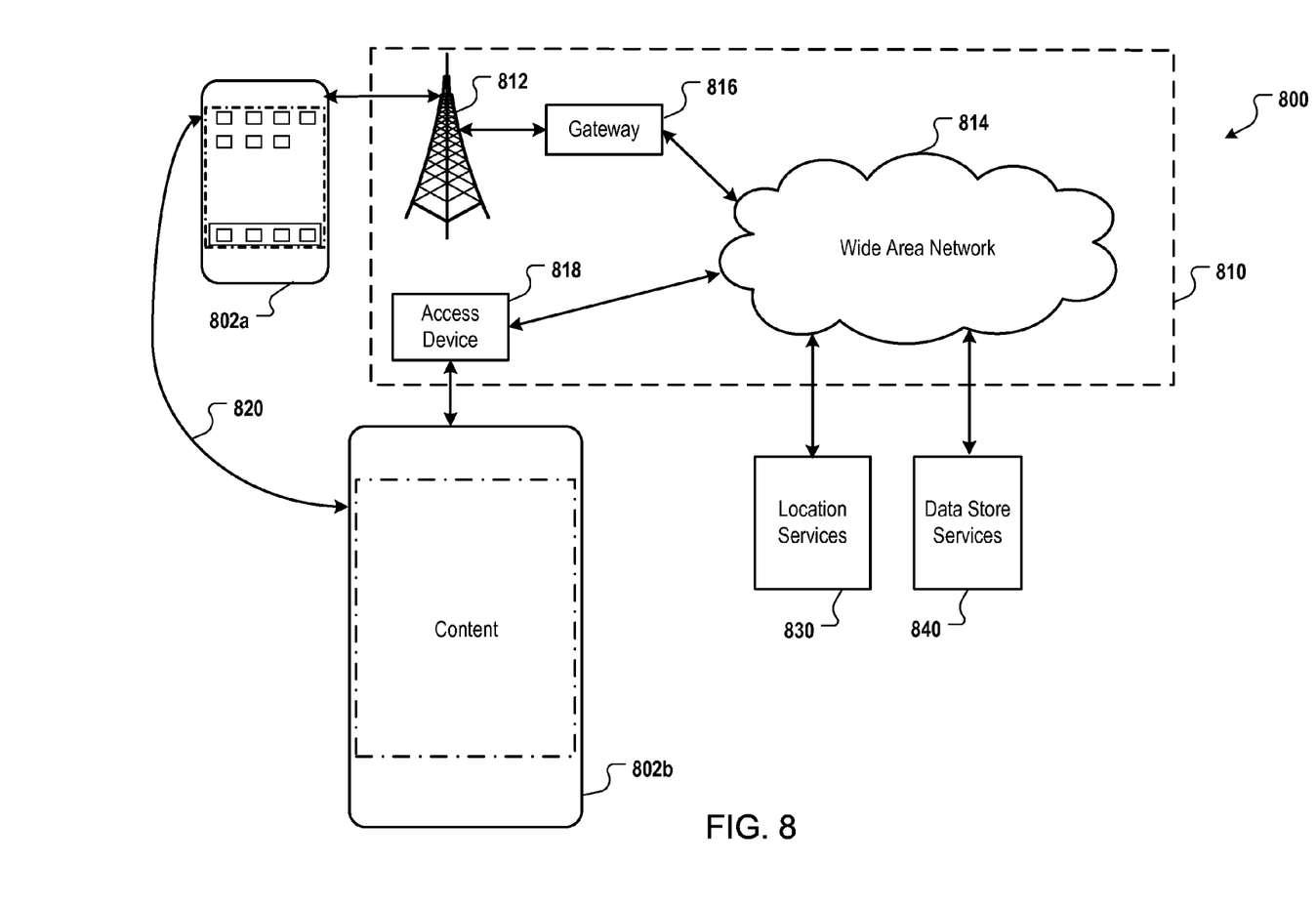
FIG. 8 is a block diagram of an exemplary network operating environment for the mobile devices implementing features and operations of chunking data records.

FIG. 8 is a block diagram of an exemplary network operating environment 800 for mobile devices implementing the features and operations of chunking data records. Mobile devices 802a and 802b can be mobile device such as mobile device 100 of FIG. 1. Mobile devices 802a and 802b can, for example, communicate over one or more wired and/or wireless networks 810 in data communication. For example, a wireless network 812, e.g., a cellular network, can communicate with a wide area network (WAN) 814, such as the Internet, by use of a gateway 816. Likewise, an access device 818, such as an 802.11g wireless access device, can provide communication access to the wide area network 814.

In some implementations, both voice and data communications can be established over wireless network 812 and the access device 818. For example, mobile device 802a can place and receive phone calls (e.g., using voice over Internet Protocol (VoIP) protocols), send and receive e-mail messages (e.g., using Post Office Protocol 3 (POP3)), and retrieve electronic documents and/or streams, such as web pages, photographs, and videos, over wireless network 812, gateway 816, and wide area network 814 (e.g., using Transmission Control Protocol/Internet Protocol (TCP/IP) or User Datagram Protocol (UDP)). Likewise, in some implementations, the mobile device 802b can place and receive phone calls, send and receive e-mail messages, and retrieve electronic documents over the access device 818 and the wide area network 814. In some implementations, mobile device 802a or 802b can be physically connected to the access device 818 using one or more cables and the access device 818 can be a personal computer. In this configuration, mobile device 802a or 802b can be referred to as a "tethered" device.

Mobile devices 802a and 802b can also establish communications by other means. For example, wireless device 802a can communicate with other wireless devices, e.g., other mobile devices 802a or 802b, cell phones, etc., over the wireless network 812. Likewise, mobile devices 802a and 802b can establish peer-to-peer communications 820, e.g., a personal area network, by use of one or more communication subsystems, such as the Bluetooth™ communication devices. Other communication protocols and topologies can also be implemented.

The mobile device 802a or 802b can, for example, communicate with one or more services 830 and 840 over the one or more wired and/or wireless networks. For example, one or more location services 830 can determine one or more location identifiers of wireless access gateways (cell towers or wireless access points) and latitude and longitude coordinates associated with the location identifiers, and provide the one or more location identifiers to mobile devices 802a and 802b for determining current locations mobile devices 802a and 802b using the location identifiers. One or more data store services 840 can provide data services including shared data services. The data store services 840 can include service of providing metadata of shared data records, including a number of times shared data records are updated, by which users, and at what time.

Mobile device 802a or 802b can also access other data and content over the one or more wired and/or wireless networks. For example, content publishers, such as news sites, Really Simple Syndication (RSS) feeds, web sites, blogs, social networking sites, developer networks, etc., can be accessed by mobile device 802a or 802b. Such access can be provided by invocation of a web browsing function or application (e.g., a browser) in response to a user touching, for example, a Web object.

A number of implementations of the invention have been described. Nevertheless, it will be understood that various modifications can be made without departing from the spirit and scope of the invention. For example, a scrollable window is described. Other form of display settings (e.g., pages) can alternatively or additionally be utilized. A data report is described. The techniques can also be applied to any content displaying applications. Accordingly, other implementations are within the scope of the following claims.

What is claimed is:

1. A method comprising:
providing for display on a mobile device a scrollable window, the scrollable window displaying first display content stored in a first display buffer, the first display content including a first portion of a border display object, the border display object being a border data item formatted according to a layout, the border data item being retrieved from a data store, the border display object comprising the first portion being located in the scrollable window and a second portion that, when formatted, is located outside of the scrollable window;
determining that the scrollable window will cross a boundary of the first display buffer;
creating second display content in a second display buffer upon the determining, the second display content including the second portion of the border display object, wherein creating the second display content comprises:
retrieving the border data item from a storage device that is different from the data store;
retrieving a next data record from the data store;
generating the second portion of the border display object for the second display content, including formatting the border data item according to the layout; and
formatting the next data record for the second display content according to the layout; and
providing for display the second display content when the scrollable window crosses the boundary.

2. The method of claim 1, where the border data item and the next data record are retrieved from the data store using a same set of selection criteria.

3. The method of claim 2, where creating the second display content in the second display buffer includes, responsive to determining that the scrollable window will cross the boundary of the first display buffer,
identifying the border data item.

4. The method of claim 3, where identifying the border data item includes:
identifying a data record that satisfies the set of selection criteria and that, when formatted according to the layout, intersects the boundary, wherein the data record is a unit of data; and
designating the identified data record as the border data item.

5. The method of claim 3, where identifying the border data item includes:
   identifying a set of data records that, as a group, intersects the boundary when formatted according to the layout; and
   designating the identified set of data records as the border data item.

6. The method of claim 5, where identifying the set of data records includes identifying a derived data field, the derived data field having a value that is calculated based on the set of data records.

7. The method of claim 6, where the derived data field is a summary data field.

8. The method of claim 1, where determining that the scrollable window will cross the boundary includes determining that a change of orientation of the mobile device will cause the scrollable window to change between a landscape display mode and a portrait display mode.

9. The method of claim 1, where determining that the scrollable window will cross the boundary includes determining that the scrollable window has reached the boundary.

10. The method of claim 1, where determining that the scrollable window will cross the boundary occurs before the scrollable window reaches the boundary.

11. The method of claim 1, where the mobile device is connected to the data store through a communications network.

12. A non-transitory computer readable medium storing instructions that are executable by a processing device, and upon such execution cause the processing device to perform operations comprising:
   providing for display on a mobile device a scrollable window, the scrollable window displaying first display content stored in a first display buffer, the first display content including a first portion of a border display object, the border display object being a border data item formatted according to a layout, the border data item being retrieved from a data store, the border display object comprising the first portion being located in the scrollable window and a second portion that, when formatted, is located outside of the scrollable window;
   determining that the scrollable window will cross a boundary of the first display buffer;
   creating second display content in a second display buffer upon the determining, the second display content including the second portion of the border display object, wherein creating the second display content comprises:
      retrieving the border data item from a storage device that is different from the data store;
      retrieving a next data record from the data store;
      generating the second portion of the border display object for the second display content, including formatting the border data item according to the layout; and
      formatting the next data record for the second display content according to the layout; and
   providing for display the second display content when the scrollable window crosses the boundary.

13. The non-transitory computer readable medium of claim 12, where the border data item and the next data record are retrieved from the data store using a same set of selection criteria.

14. The non-transitory computer readable medium of claim 13, where creating the second display content in the second display buffer includes, responsive to determining that the scrollable window will cross the boundary of the first display buffer,
   identifying the border data item.

15. The non-transitory computer readable medium of claim 14, where identifying the border data item includes:
   identifying a data record that, that satisfies the set of selection criteria and when formatted, intersects the boundary, wherein the data record is a unit of data; and
   designating the identified data record as the border data item.

16. The non-transitory computer readable medium of claim 14, where identifying the border data item includes:
   identifying a set of data records that, as a group, intersects the boundary when formatted according to the layout; and
   designating the identified set of data records as the border data item.

17. The non-transitory computer readable medium of claim 16, where identifying the set of data records includes identifying a derived data field, the derived data field having a value that is calculated based on the set of data records.

18. A system, comprising:
   one or more computers configured to perform operations comprising:
      providing for display on a mobile device a scrollable window, the scrollable window displaying first display content stored in a first display buffer, the first display content including a first portion of a border display object, the border display object being a border data item formatted according to a layout, the border data item being retrieved from a data store, the border display object comprising the first portion being located in the scrollable window and a second portion that, when formatted, is located outside of the scrollable window;
      determining that the scrollable window will cross a boundary of the first display buffer;
      creating second display content in a second display buffer upon the determining, the second display content including the second portion of the border display object, wherein creating the second display content comprises:
         retrieving the border data item from a storage device that is different from the data store;
         retrieving a next data record from the data store;
         generating the second portion of the border display object for the second display content, including formatting the border data item according to the layout and
         formatting the next data record for the second display content according to the layout; and
      providing for display the second display content when the scrollable window crosses the boundary.

19. The system of claim 18, where the border data item and the next data record are retrieved from the data store using a same set of selection criteria.

20. The system of claim 19, where creating the second display content in the second display buffer includes, responsive to determining that the scrollable window will cross the boundary of the first display buffer:
   identifying a data record that satisfies the set of selection criteria and that, when formatted according to the layout, intersects the boundary, wherein the data record is a unit of data; and designating the identified data record as the border data item.

* * * * *

UNITED STATES PATENT AND TRADEMARK OFFICE
CERTIFICATE OF CORRECTION

| | | |
|---|---|---|
| PATENT NO. | : 8,429,556 B2 | |
| APPLICATION NO. | : 12/840208 | |
| DATED | : April 23, 2013 | |
| INVENTOR(S) | : Christopher Crim | |

It is certified that error appears in the above-identified patent and that said Letters Patent is hereby corrected as shown below:

In the Claims

Claim 18, column 14, line 52, delete "layout" and insert -- layout; --.

Signed and Sealed this
First Day of October, 2013

Teresa Stanek Rea
*Deputy Director of the United States Patent and Trademark Office*